Patented Feb. 19, 1924.

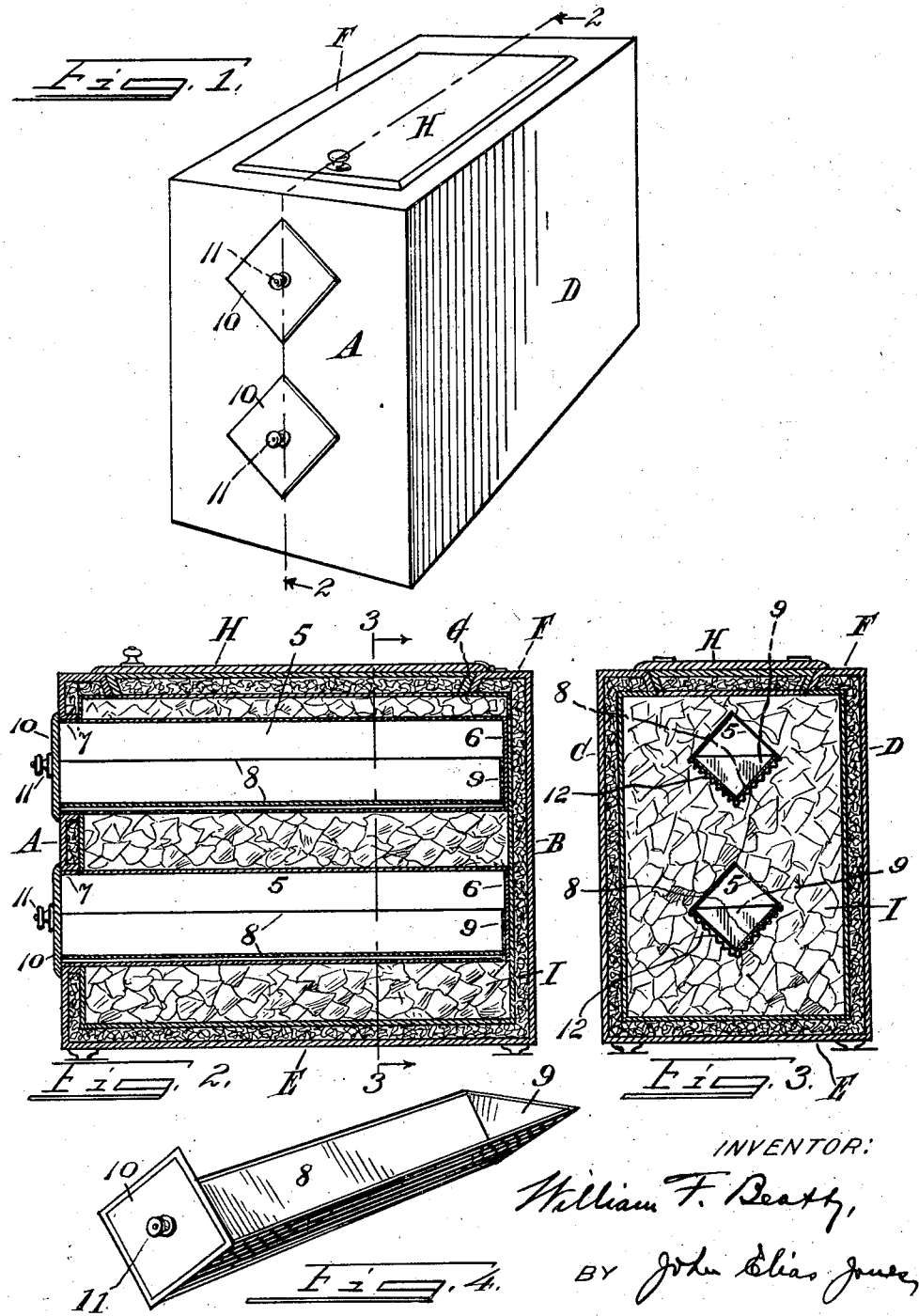

1,484,110

UNITED STATES PATENT OFFICE.

WILLIAM F. BEATTY, OF CINCINNATI, OHIO.

CABINET FOR BRICK OR CAKE ICE CREAM.

Application filed October 10, 1921. Serial No. 506,682.

*To all whom it may concern:*

Be it known that I, WILLIAM F. BEATTY, a citizen of the United States of America, and a resident of Cincinnati, in the county of Hamilton and State of Ohio, have invented a certain new and useful Improvement in Cabinets for Brick or Cake Ice Cream, of which the following is a specification.

This invention relates to sales or storage and serving cabinets used by dispensers of ice-cream and the like in cake or brick form at serving-counters or elsewhere, and the prime object of my invention herein is to provide a retail-sales and individual or divisible serving cabinet that has in its structure a main ice or refrigerating receptacle, a multiple of horizontal, tubular or tunneled compartments or elongated pockets supported in the refrigerating-medium of the said receptacle and with openings leading to the outside of the insulated walls of the receptacle, a slidable drawer or tray for each of said horizontally-arranged tunneled compartments and adapted to contain or hold ice-cream in wrapped, merchantable, individual brick or in wrapped divisible block form for retail sales or for individual personal service, as the case may be or as occasion may require, and such drawer or tray being of V-shape cross-section and having a closing-head at its outer end to fill the outer end or mouth of the said tunneled compartment and thereby prevent the undesirable entrance of warm air to said tunneled compartment and its brick or block cream contents. Heretofore, individual-brick and divisible-block ice-cream have been placed in tin boxes each holding a quart or like measured quantity of the ice-cream in said forms in cylindrical, large, metal freezer-cans that, in turn, were placed in wooden barrels or tubs, with a supply or charge of broken-ice and coarse salt surrounding the large freezer-can in said barrel, which has been impracticable and inconvenient, as well as untidy and not strictly sanitary or economical. I now propose to rectify such former defects in the provision of my cabinet herein that I shall now proceed to describe in detail in connection with the accompanying sheet of drawings, in which:—

Figure 1 is a perspective view of the cabinet, showing its exterior only; Fig. 2, a longitudinal section taken on the central dotted-line 2, 2, of Fig. 1, showing the internal structure of the cabinet that embodies my invention herein; Fig. 3, a transverse section taken on the perpendicular dotted-line 3, 3, of Fig. 2, still further clearing the disclosure of my invention herein; and Fig. 4, a perspective view of the peculiar form of slidable service-drawer or brick ice-cream container-tray used in my cabinet herein.

The cabinet is a square or cubic structure composed of opposite end-walls A and B, opposite side-walls C and D, bottom E and top F, all duly insulated and the said top F having an elongated opening G that is provided with an insulated lid or cover H for access to the interior to fill it with ice or other freezing or refrigerating medium I, and for cleaning or repairing the interior when desired. Thus far there is nothing new about the cabinet itself, but what I wish to state herein as new I will now proceed to describe in detail, and it is certainly exceedingly simple, effective, desirable and very economical to produce and use, as well as to maintain.

5 indicates each one of a pair of tubular compartments, made elongated and of square cross-section, and mounted horizontally, one above the other, within the main cooling-receptacle of the cabinet, one end 6 thereof being closed and suitably secured to the inner face of the rear end-wall B and the other end 7 being open and extending flush through the fore-wall A of the cabinet, as best seen in Fig. 2. Both of these tubular compartments form tunnels, as it were, open to the serving-front of the cabinet, and are arranged or set so that their four flat sides shall lie at oblique planes or at angles of forty-five degrees to the inner walls of the cabinet, as best shown in Fig. 3, rather than with said flat sides lying parallel to the top and side walls of said cabinet, and whereby any meltings of the ice may freely drip from the inclined sides and to avoid any lodging or shelving of the ice or meltings on the said tunnels. Besides, the tunnels are best adapted, when set at said oblique position, to contain or accommodate my special and peculiar form of drawer or tray 8 used in each tunnel and which I will now endeavor to describe and point out in detail.

Each drawer or tray 8 is composed of a body-portion of V-shaped cross-section, having a triangular rear-end 9 and a square fore-end 10, the latter having a convenient handle 11 and being adapted to close the mouth of the tunnel when the drawer or tray is in its normal or proper place within the cabinet and effectually shutting out any undesirable warm air and other things of a harmful tendency to the contents of the tray or its incasing-tunnel. This tray is intended to receive and hold the ice-cream in either individual or in divisible brick or block form, duly wrapped or in cartons to suit the service required and apportioned in thick or in thin cakes or slices that are laid side-by-side or face-to-face along the tray and arranged convenient to the handler of the commodity so that he can easily and accurately removed one or more of the individual cakes from the tray for either retail or other sales service, or for personal distribution at counters or direct to the individual consumer, respectively, as desired.

The trays can, of course, be used to hold the commodity in block form, of large or small size, that is to be cut down into individual cakes, bricks, or slices, as occasion may require.

The location of the tunnels in the cabinet is such that said loaded trays are inclosed free from any possible contact with the interior of the cabinet or its refrigerator-medium contents and, also, from the outside air or other obnoxious or harmful influences, and the space within the cabinet is fully utilized to at least double the capacity of former cabinets in which but a single upright can of ice-cream in brick form, of single capacity could be accommodated and properly cared for, or, in other words, two of my horizontal trays, or even more than two, can be properly cared for in the cabinet made as I now have it and as described and shown herein, where but one vertical can could be cared for in the same cabinet-space and with very materially less ice-cream bricks therein.

Instead of using a tunnel closed at one end a tunnel can be used extending clear across the cabinet, open from end to end and with a pair of trays in each tunnel, but shorter ones, of course, and with their inner ends abutting, if found desirable, and each tray provided with a square closing-head 10 to exclude the outside air and so forth. Further still, the cabinet is adapted to contain quite a large number of my peculiar form of drawers and tunnels and each one to hold a different kind or flavor of cream or commodity in its frozen state, in brick or block form, individual or divisible, as desired, and the outer closing-head duly labeled to indicate the contents of the respective trays, for great convenience in dispensing.

It will be readily seen that in pulling out the several drawers or trays no warm air can get at the ice or within the regrigerating-chamber to melt it, as the tunnels protect the interior of the cabinet against any such intrusion to cause loss in so many ways.

In Fig. 3 I have shown the bottoms of the several tunnels as being ribbed or corrugated at 12 to provide a sliding-surface for the trays and to reduce the chance of frost forming on the inner faces of the tunnel bottoms to such an extent as to make the trays stick in the tunnels, which might otherwise happen just when not expedient at all and render it difficult to remove said trays.

A suitable draw-off cock (not shown) may be provided near the bottom of the cadinet to drain it at any time. The lid need not be opened except to replenish with ice or cold refrigerant, or to clean the interior, thus saving on ice and brine.

I claim:—

A brick ice-cream cabinet comprising a main rectangular or box-like hollow structure having insulated top, bottom and vertical walls and adapted to contain within its entire interior a supply of refrigerating-medium, a lid-closed orifice in the top of the structure for access thereto in the filling therein of the said refregerating-medium and in cleaning its said interior, a multiple of square-section horizontal tubes having corrugated bottoms and supported within said hollow structure to provide tunnels or tubular-compartments that extend across the interior of the structure and with each tube open at one of its ends to the outside of the cabinet but sealed or closed otherwise aginst leakage from the surrounding refrigerating-medium within the structure, and an elongated tray or drawer removably-inserted in each of said tunnels or tubular-compartments and having a square-shaped head that is adapted to close the mouth of the tunnel or tubular-compartment when said drawer is in using-position within the cabinet and with the bottom or body-portion proper of the drawer in a V-shaped cross-section and adapted to contain the brick ice-cream commodity for ready apportioned-service from the cabinet, and the said square-section tunnels or tubular-compartments being arranged within the structure so that their four flat-faced walls shall lie at oblique planes to the sides of the cabinet and so that the angles or corners thereof may present ready-drip faces and edges for the said refrigerating-medium, especially when it is composed of broken or chopped ice, within the cabinet, substantially as herein shown and described.

WILLIAM F. BEATTY.